Aug. 29, 1944.  B. R. PURVIN  2,356,796
METAL CUTTING TOOL
Filed Sept. 3, 1938  9 Sheets-Sheet 1
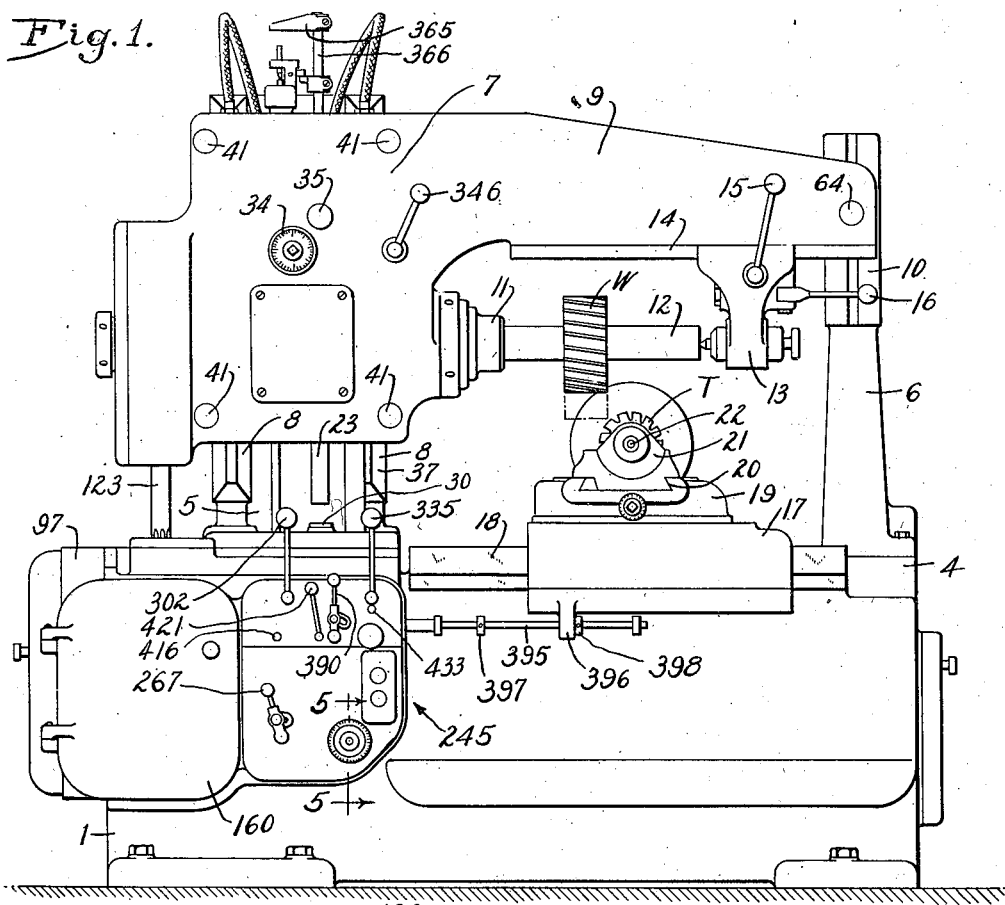
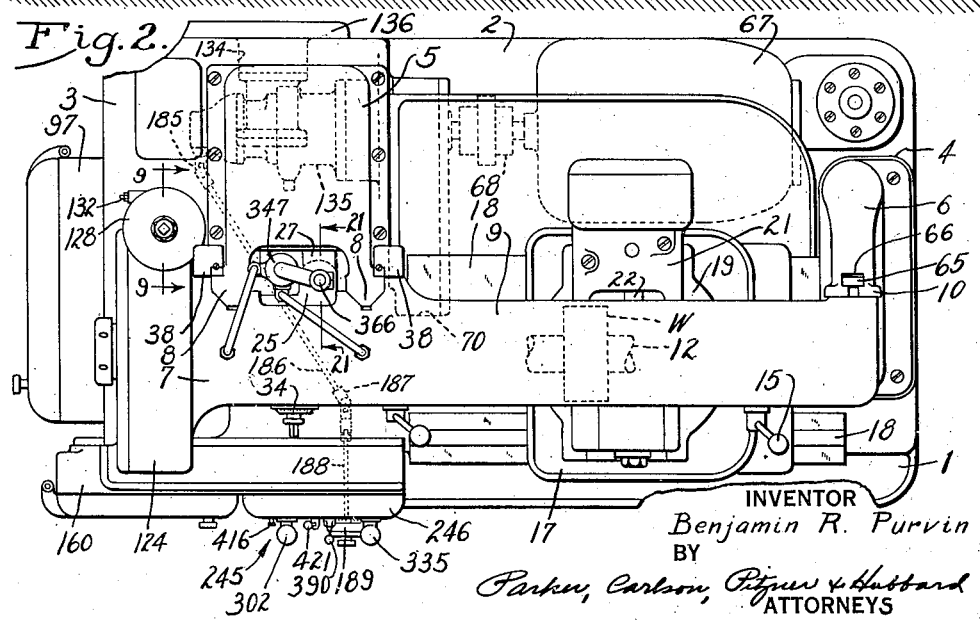
INVENTOR
Benjamin R. Purvin
BY
Parker, Carlson, Pitzner & Hubbard
ATTORNEYS

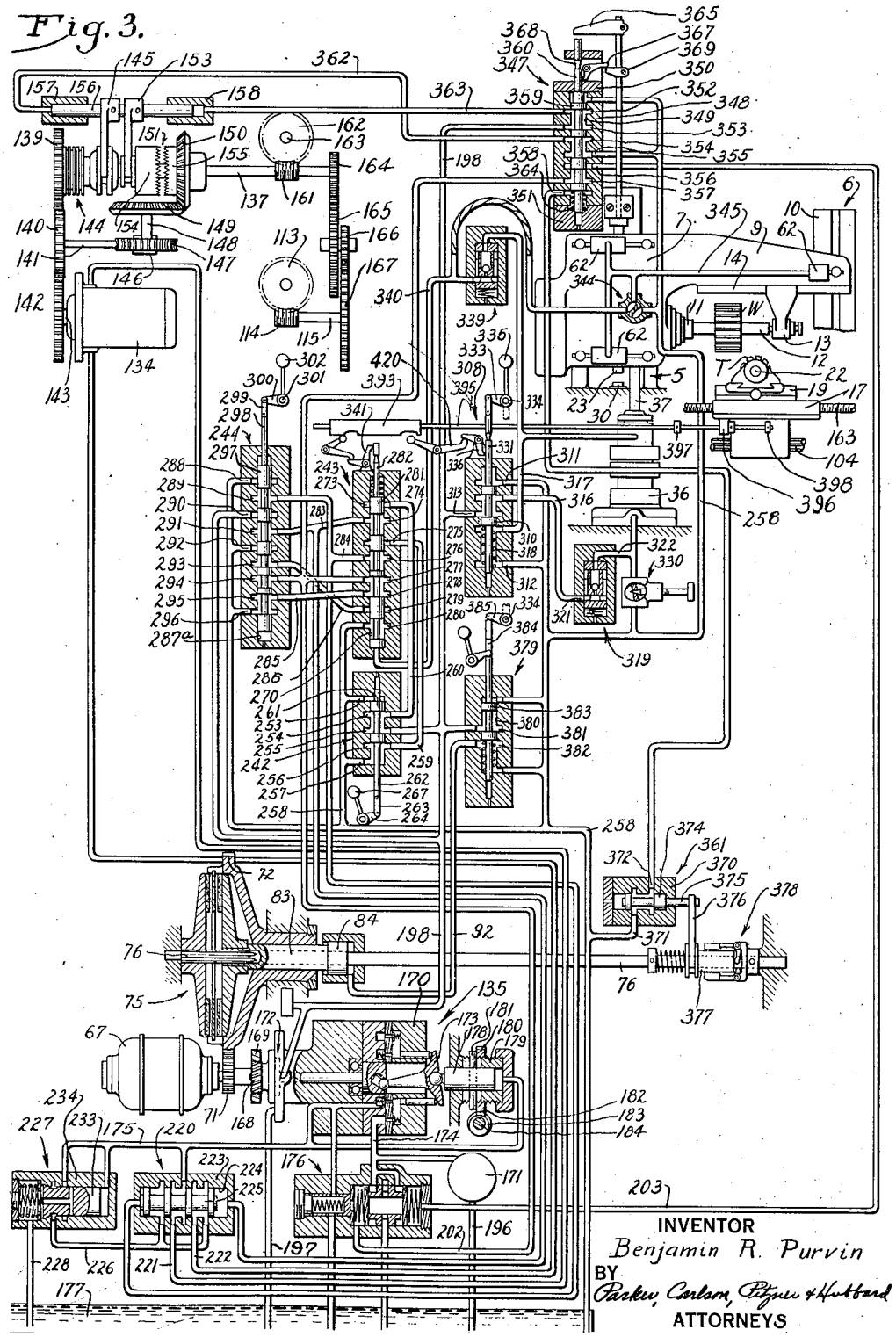

Aug. 29, 1944.   B. R. PURVIN   2,356,796
METAL CUTTING TOOL
Filed Sept. 3, 1938   9 Sheets-Sheet 3

INVENTOR
Benjamin R. Purvin
BY
Parker, Carlson, Pitner & Hubbard
ATTORNEYS

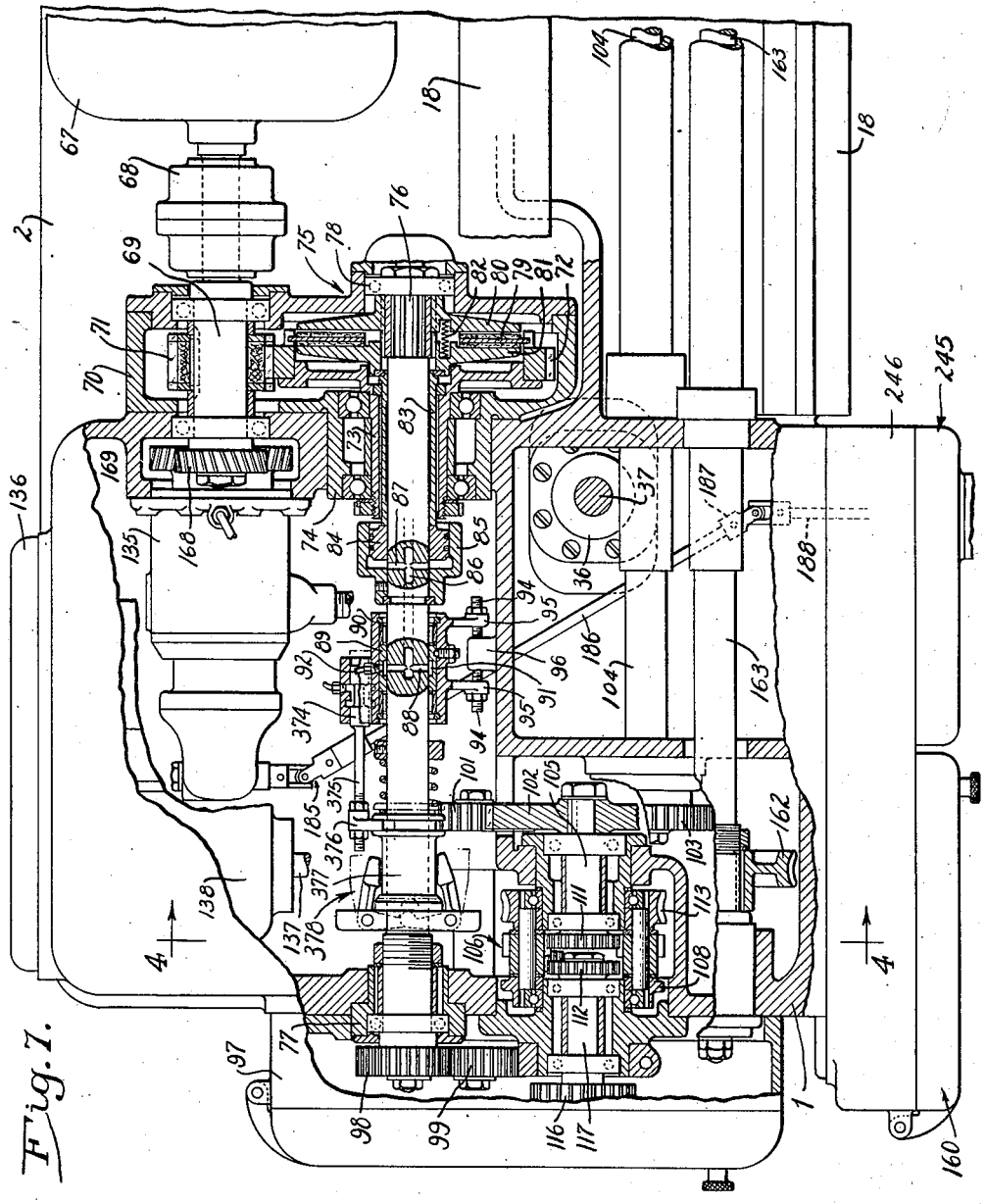

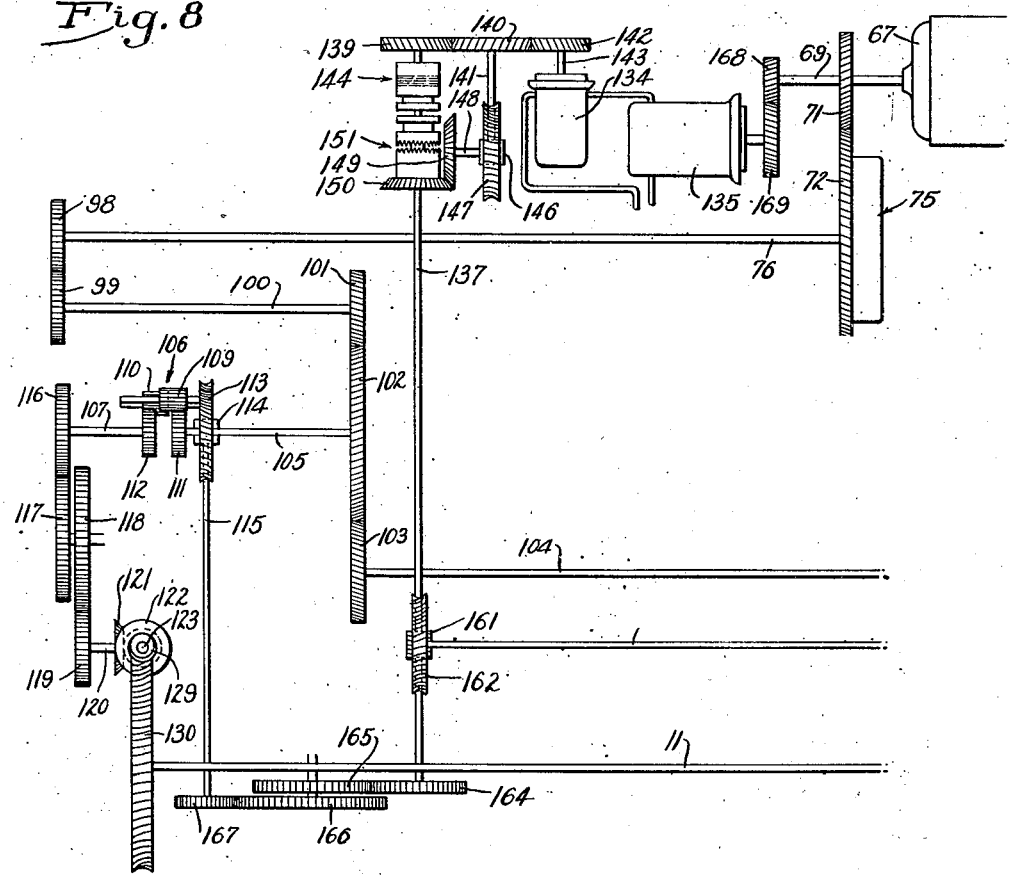

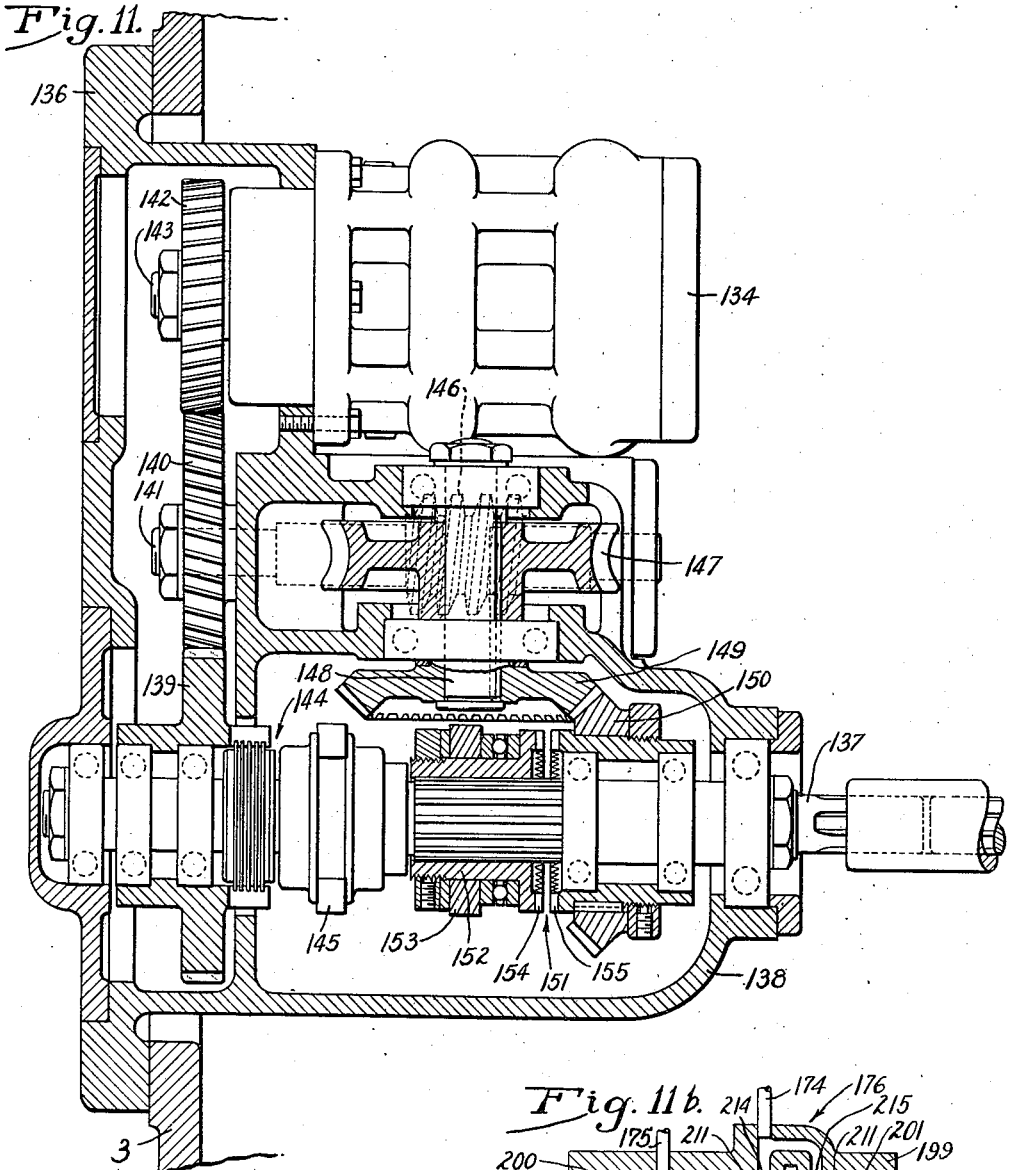
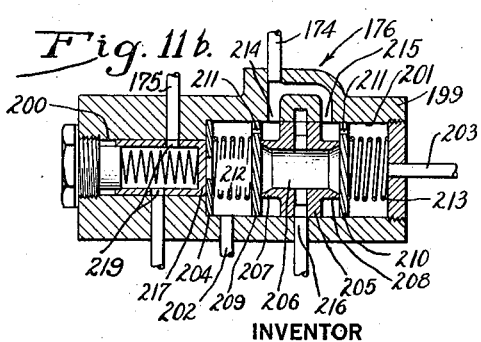

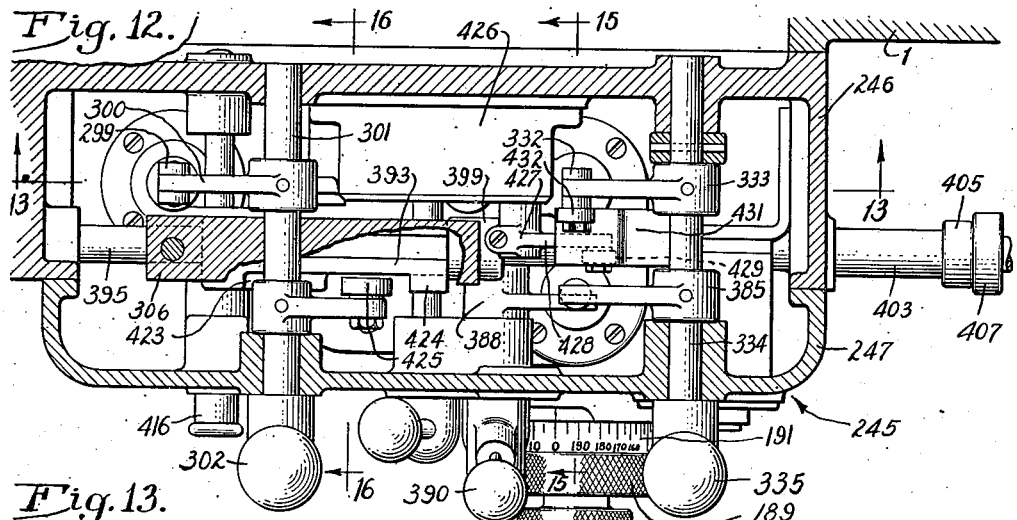
Fig. 12.
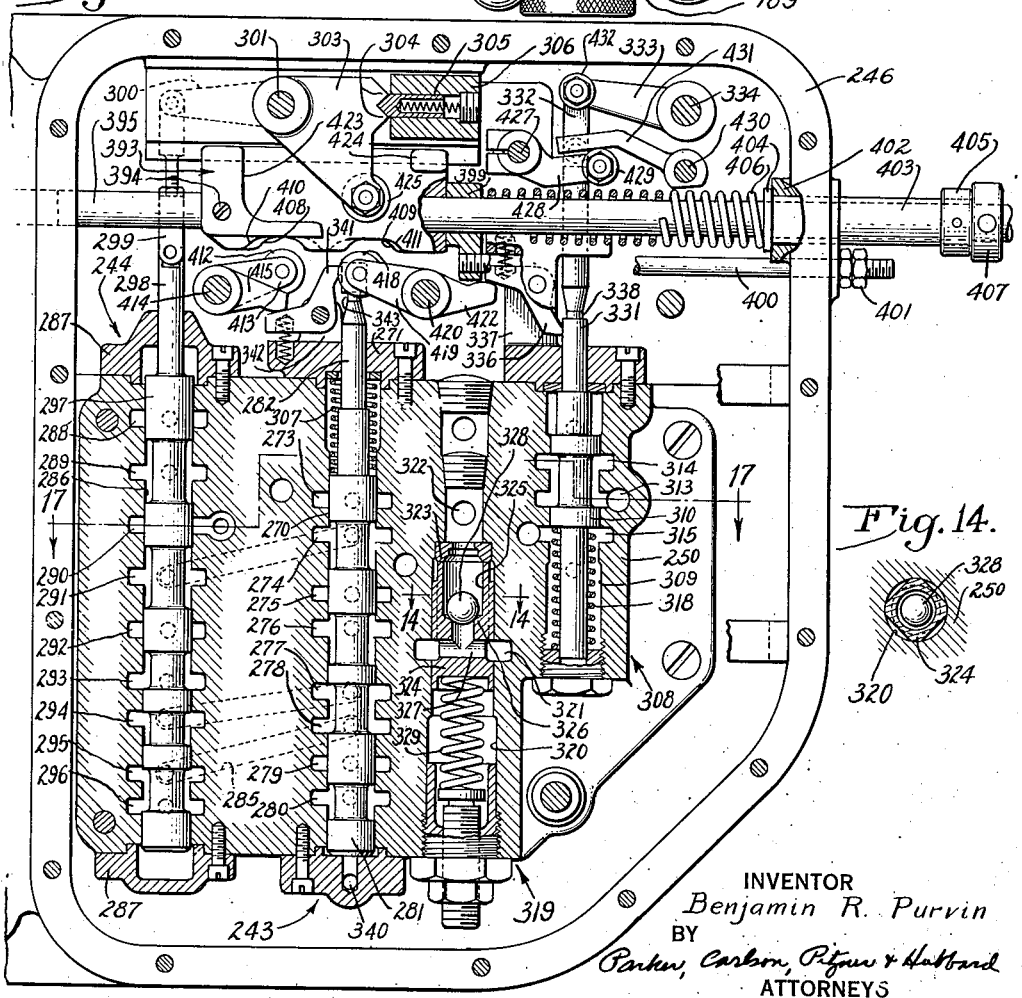
Fig. 13.
Fig. 14.
INVENTOR
Benjamin R. Purvin
BY
Parker, Carlson, Pitzner & Hubbard
ATTORNEYS Aug. 29, 1944.  B. R. PURVIN  2,356,796
METAL CUTTING TOOL
Filed Sept. 3, 1938  9 Sheets-Sheet 8

INVENTOR
Benjamin R. Purvin
BY
Parker, Carlson, Pitney & Hubbard
ATTORNEYS

Aug. 29, 1944.  B. R. PURVIN  2,356,796
METAL CUTTING TOOL
Filed Sept. 3, 1938   9 Sheets-Sheet 9

INVENTOR
Benjamin R. Purvin
BY
Parker, Carlson, Pitney & Hubbard
ATTORNEYS

Patented Aug. 29, 1944

2,356,796

UNITED STATES PATENT OFFICE 2,356,796

METAL-CUTTING TOOL

Benjamin R. Purvin, Rockford, Ill., assignor to Barber-Colman Company, Rockford, Ill., a corporation of Illinois Application September 3, 1938, Serial No. 228,312

22 Claims. (Cl. 90—4)

The present invention relates to improvements in machine tools, and has particular reference to a new and improved metal cutting machine, of the type disclosed in my copending application Serial No. 75,949, filed April 23, 1936, now Patent Number 2,167,267, issued July 25, 1939, adapted for hobbing spur gears, helical gears, spur and spiral spline shafts, and other symmetrical forms capable of being hobbed.

One of the important objects of the present invention is to provide a novel hobbing machine which results in the tool having a greatly increased life, which has a high rate of production because of improved means for supporting the hob and the work and increased hob speeds and cutting feeds, which accurately maintains close tolerances and produces an improved finish, which has an infinitely variable range of feeds from zero to maximum, which is simple and easy to operate, and which is compact, rigid and sturdy in construction.

Another object is to provide a new and improved hobbing machine which is automatic in operation, and in which the primary movements of the tool and work and the actuation of various clamping devices are obtained by hydraulic power, thereby reducing and lightening the manual labor required in the set-up and control of the machine.

A further object is to provide a novel automatic hobbing machine having a work spindle and a hob spindle relatively translatable axially of the work spindle, and having cycle control means selectively adjustable to obtain a conventional cycle in which the spindle translation comprises a feeding movement in one direction, automatic reversal, a rapid traverse movement in the other direction and an automatic stop, or a climb cutting cycle in which the aforesaid movements are reversed, or either of the foregoing cycles with an automatic stop at the end of the feed movement.

Another object is to provide a new and improved hobbing machine having a spindle slide movable selectively into an inoperative position or an operative position, and means for automatically clamping the slide in operative position.

A further object is to provide a novel hobbing machine having a base with a vertical column, a tool spindle slide on the base, a work spindle slide on the column, adjustable stop means for limiting the movement of the work spindle slide either into a lowered operative position or into an elevated inoperative position, and hydraulic means for elevating and lowering the tool spindle slide.

Another object is to provide a novel hobbing machine comprising work and tool spindles, means for rotating the spindles in timed relation including a differential mechanism for varying the relation, a selective mechanical rapid traverse and feed drive for effecting relative translation between the spindles and operation of the differential mechanism, and a selective rapid traverse and feed hydraulic transmission for actuating the mechanical drive.

A further object is to provide novel means for preventing translation of the tool spindle slide unless the work and tool spindle are rotating.

Further objects and advantages will become apparent as the description proceeds.

In the accompanying drawings,

Figure 1 is a front elevational view of a hobbing machine embodying the features of my invention.

Fig. 2 is a plan view of the machine.

Fig. 3 is a diagrammatic representation of the drive for the machine, and particularly the hydraulic transmission.

Fig. 7 is a fragmentary horizontal sectional view of the machine taken substantially along line 7—7 of Fig. 4.

Fig. 8 is a diagrammatic representation of the gear drive of the machine.

Fig. 9 is a fragmentary detail sectional view taken substantially along line 9—9 of Fig. 2.

Fig. 10 is a sectional view taken along line 10—10 of Fig. 9.

Fig. 11 is a sectional view of the feed unit taken substantially along line 11—11 of Fig. 4.

Fig. 11a is an enlarged view of the back pressure valve illustrated in Fig. 3.

Fig. 11b is an enlarged view of the start and stop valve illustrated in Fig. 3.

Fig. 12 is a horizontal sectional view of the valve control unit.

Fig. 13 is a vertical sectional view of the valve control unit taken substantially along line 13—13 of Fig. 12.

Fig. 14 is a detail sectional view taken substantially along line 14—14 of Fig. 13.

Figure 15:
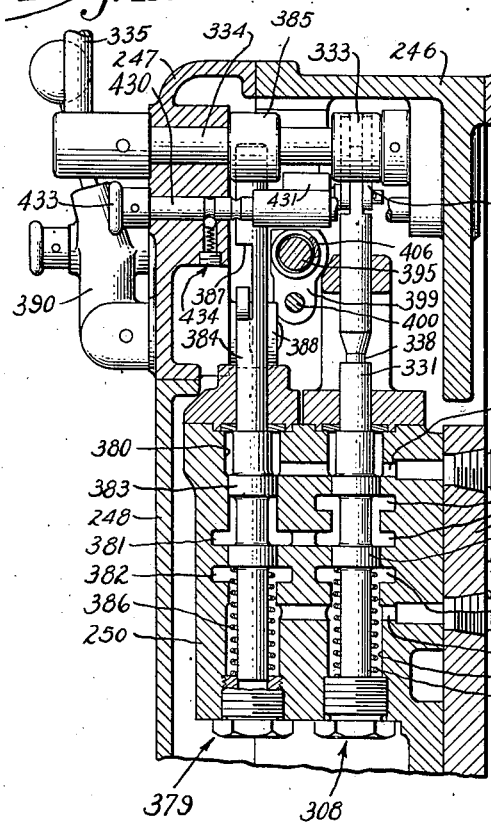
Figure 16:
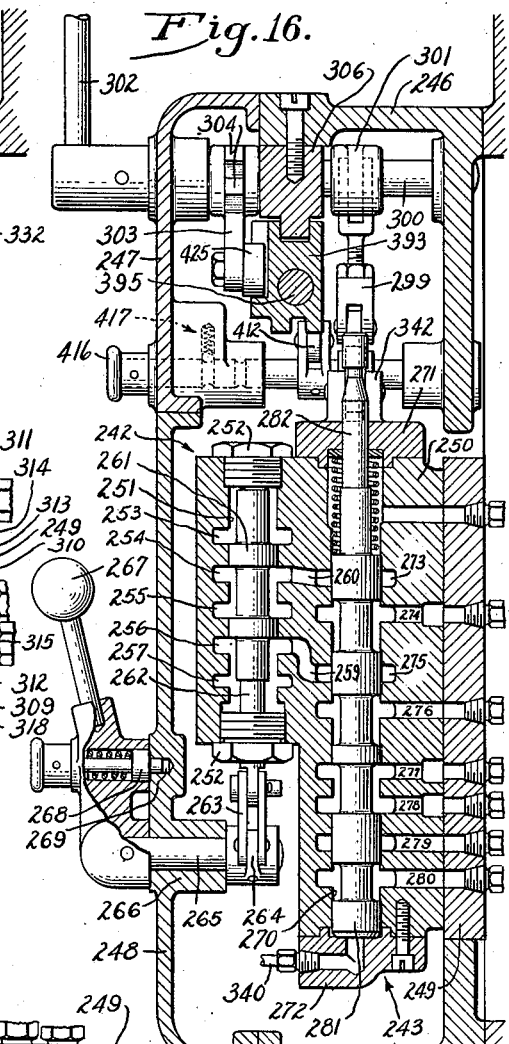

Figs. 15 and 16 are vertical sectional views of the valve control unit taken respectively along lines 15—15 and 16—16 of Fig. 12.

Figure 17:
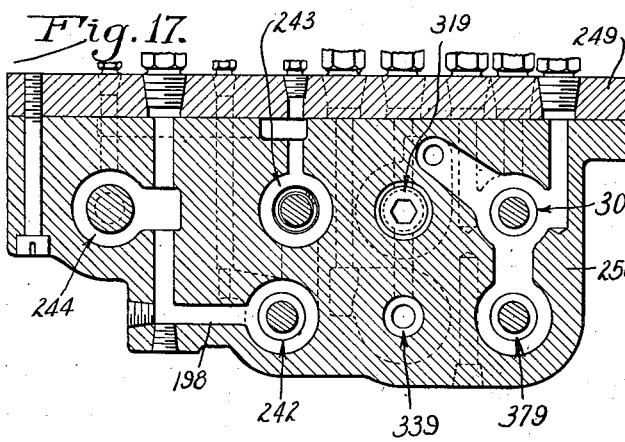

Fig. 17 is a horizontal sectional view of the valve control unit taken substantially along line 17—17 of Fig. 13.

Figure 18:
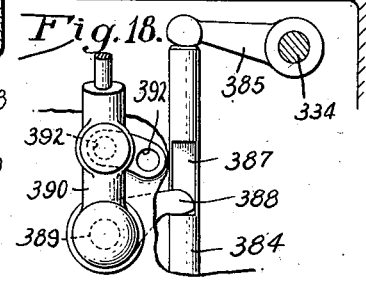

Fig. 18 is a detail view of means for controlling the clutch valve.

Figure 19:
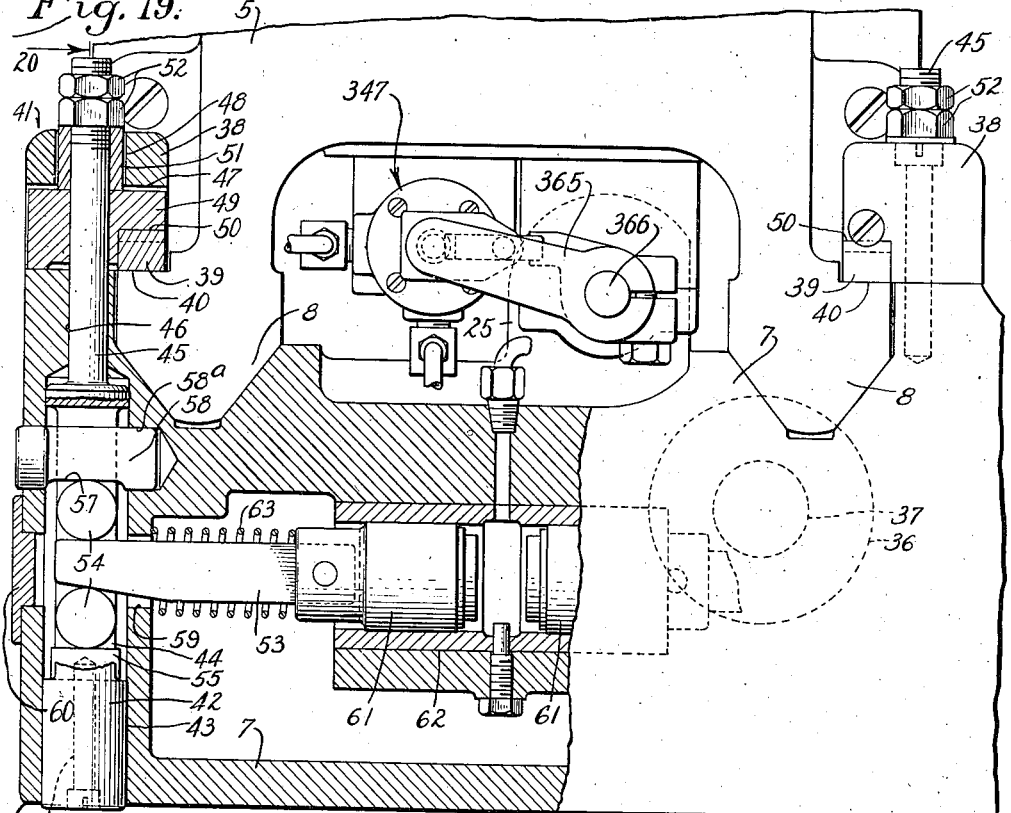

Fig. 19 is a sectional view on an enlarged scale of the work slide clamping means.

Figure 20:
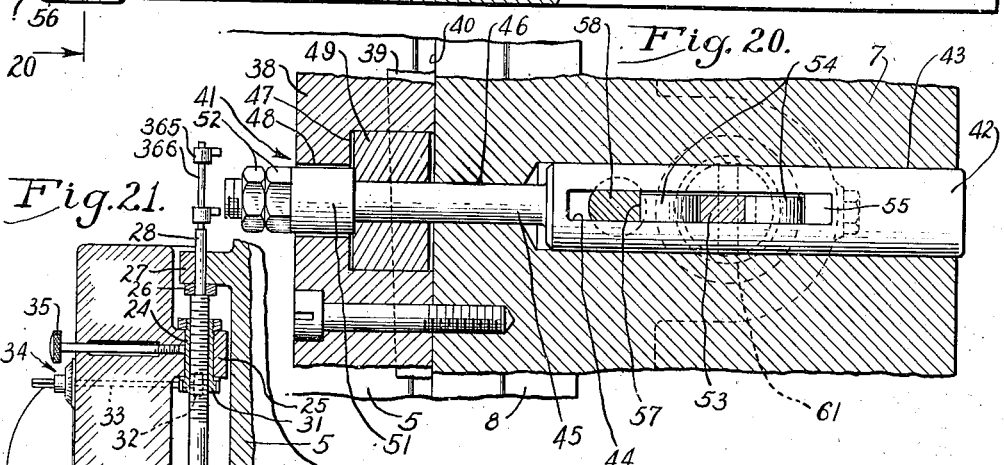

Fig. 20 is a fragmentary vertical sectional view taken along line 20—20 of Fig. 19.

Figure 21:
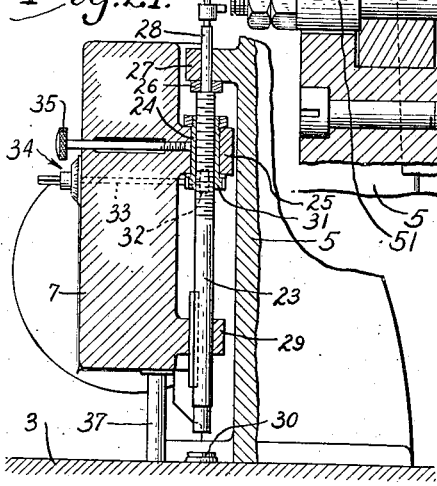

Fig. 21 is a fragmentary sectional view taken along line 21—21 of Fig. 2, and illustrating means for adjusting and positioning the work slide.

The hobbing machine constituting the exemplary embodiment of the invention comprises a hollow base which consists of a horizontal bed 1 having a low platform 2 at the rear, and opposite end pedestals 3 and 4. Two upright columns 5 and 6 are rigidly mounted respectively on the pedestals 3 and 4.

A work slide 7 is mounted for vertical positioning on double V ways 8 formed on the front of the column 5, and has an integral over-arm 9 guided on flat ways 10 on the front of the column 6. Journaled in the slide 7 is a hollow work spindle 11 adapted to be connected to one end of a work arbor 12 supporting a gear blank W. The other end of the arbor 12 is adapted to be supported by an outboard support or tailstock 13 mounted for adjustment on longitudinal dovetail ways 14 on the underside of the over-arm 9. The tailstock 13 may be adjusted along the ways 14 by gear means (not shown) having an operating lever 15, and may be clamped in position by a clamp (not shown) having an operating lever 16.

A hob slide 17 is mounted on V and flat ways 18 on the top of the bed 1 for travel axially of the spindle 11. A swivel plate 19 is mounted on the slide 17 for angular adjustment about a vertical axis, and is formed with a diametrical guideway 20 adjustably supporting a spindle slide 21. Journaled in the slide 21 is a spindle 22 adapted to support a cutting tool or hob T.

The work slide

The work slide 7 is movable hydraulically either into an elevated inoperative position or a lowered operative position, and is adapted to be clamped hydraulically in the operative position. These positions are defined by a non-rotatable vertical screw 23 (see Fig. 21) threaded through a rotary nut 24 journaled in a lug 25 on the rear of the slide 7 between the ways 8. The upper end of the screw 23 carries an abutment plate 26 adapted for engagement with the underside of a forwardly projecting lug 27 on the column 5 to define the inoperative position, and has an axial extension 28 of reduced diameter extending slidably through the lug. The lower end of the screw 23 is splined for axial movement through a lug 29 on the rear and adjacent the bottom of the slide 7, and is adapted for engagement with a positive stop 30 on the bed 1 to define the operative position. The screw 23 is vertically adjustable relative to the work slide 7 to establish precisely the desired depth of cut. Thus, a spiral gear 31 coaxial and rigid with the lower end of the nut 24 meshes with a spiral pinion 32 fixed on the inner end of a shaft 33 journaled in the slide 7 and extending therethrough to the front of the machine. A micrometer dial 34 is fixed on the front end of the shaft 33 to indicate the depth adjustment. A locking screw 35 is threaded through the slide 7 for engagement with the periphery of the nut 24 to secure the stop screw 23 releasably in position.

Figure 4:
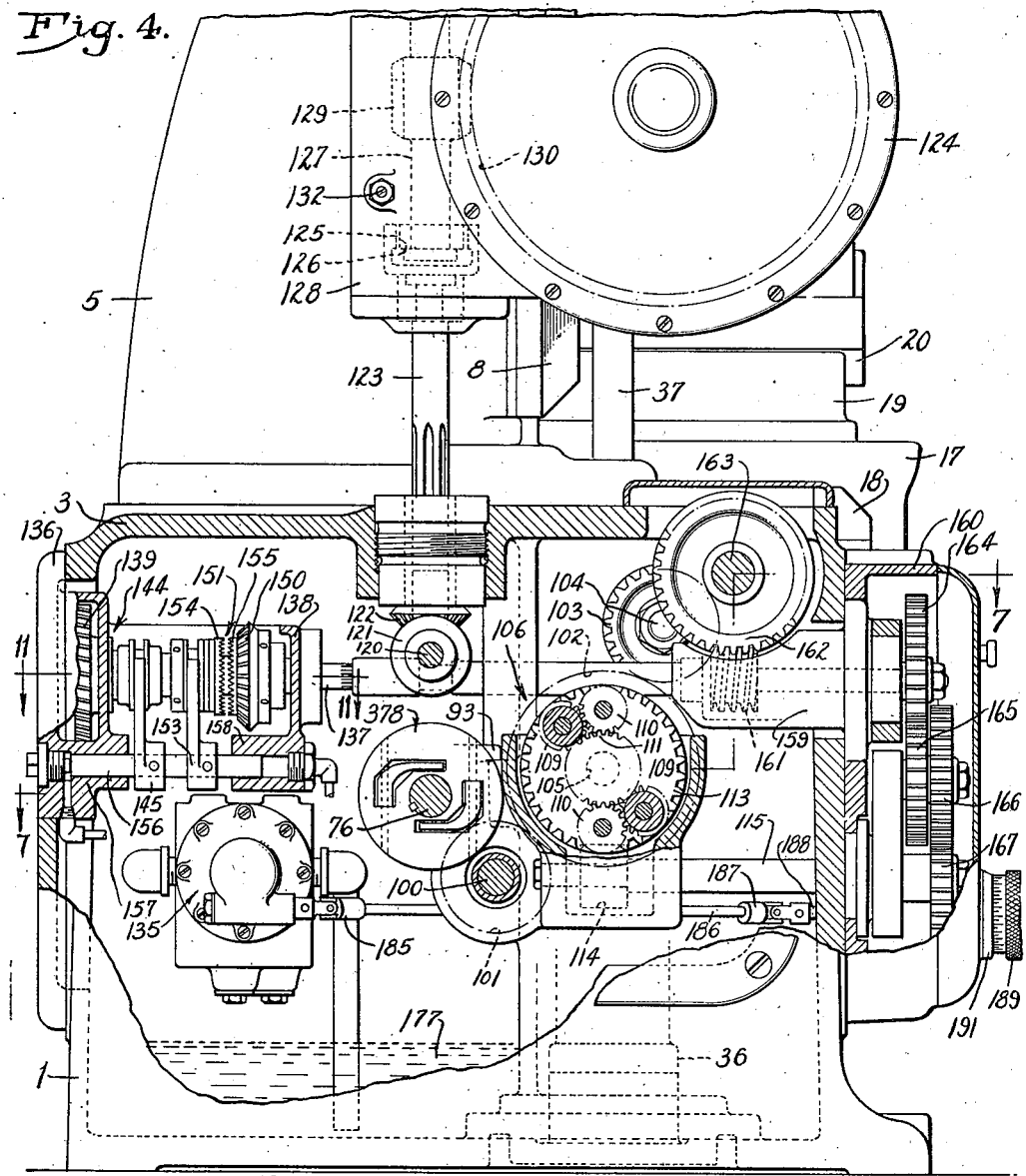
Fig. 4 is a left end view of the machine, partially in section along line 4—4 of Fig. 7.

Vertical movement of the work slide 7 between the limit positions is obtained by a hydraulic cylinder and piston motor 36 (see Figs. 3 and 4) rigidly mounted on the floor of the pedestal 3 and having a vertical piston rod 37 extending upwardly into operative engagement with the bottom of the slide body.

The work slide 7 is confined for vertical movement against the ways 8 by suitable gib plates 38 (see Figs. 19 and 20) bolted in position. Adjustably mounted in the plates 38 are suitable tapered gibs 39 engaging rear clamping surfaces 40 on the ways 8. A plurality of hydraulically operable clamps 41, four in the present instance and located respectively adjacent the ends of the gib plates 38, are arranged to coact with the gibs 39 to secure the slide 7 rigidly in operative position. These clamps preferably are alike in construction, and hence a description of one will suffice for all.

Each of the clamps 41 comprises a cylindrical plunger 42 which is slidable in a transverse bore 43 opening to the front of the work slide 7, and which intermediate its ends is formed with a longitudinal diametrical slot 44. The rear end of the plunger 42 has an axial stem 45 which extends slidably through a bore 46 to the rear of the work slide 7, and then freely through a transverse notch 47 in the inner face of the gib plate 38 and a bore 48 opening from the notch to the rear of the gib plate. A clamping block 49 is slidably disposed on the stem 45 within the notch 47, and is formed in one end with a notch 50 interfitting with and engaging the taper gib 39. A collar 51 is slidably disposed on the stem 45 within the bore 48, and is confined against the rear of the block 49 by two lock nuts 52, whereby the block may be adjusted relative to the plunger 42.

Extending transversely through the slot 44 is a wedge member 53 in the form of a flat tapered bar adapted to impart a forward thrust to the plunger 42 to apply the clamp block 49. The wedge bar 53 is in anti-friction bearing engagement at opposite sides with two rollers 54 disposed within the slot 44. One of the rollers 54 bears against a hardened block 55 removably secured by a screw 56 against the forward end of the slot 44. The other roller 54 bears against the forward edge 57 of a hardened pin 58 extending transversely through the bore 43 and the slot 44. The pin 58 is inserted in a transverse bore 58$^a$ in the side of the work slide 7, and is flattened to interfit slidably with the slot 44, thereby restraining the plunger 42 against rotation.

The wedge bar 53 extends into the bore 43 from the interior of the work slide 7 through a transverse bore 59 closed at the outer end by a cap 60, and is rigidly connected at the inner end to a piston 61 reciprocable in a hydraulic cylinder 62 adapted to receive pressure fluid. A coiled compression spring 63 engaging the piston 61 tends to retract the bar 53. It will be understood that when pressure fluid is supplied to the cylinder 62, the bar 53 will be forced outwardly, and through the rollers 54 rolling on the block 55 and the pin 58 will impart a powerful clamping thrust to the plunger 42.

The pistons 61 for the two upper clamps, and also the pistons for the two lower clamps, in each instance, are disposed in opposite ends of one cylinder 62. In addition to the four clamps for the work slide, a similar hydraulically operable clamp 64 is provided for securing the overarm 9 to the face of the column 6. This clamp comprises a headed bolt 65 movable in a vertical T-slot 66 in the column 6 between the ways 10, and connected to a plunger 42 operable by a hydraulic motor including a cylinder 62. The cylinders 62 for the five clamps may be connected in parallel as more fully described in connection with the hydraulic circuits so that the clamping pressure at all points is equalized.

Spindle drives

The work and hob spindles 11 and 22 are rotated in timed relation from an electric drive motor 67 mounted on the rear platform 2 of the machine. The motor 67 is connected through a flexible coupling 68 (see Fig. 7) to a shaft 69 journaled in a clutch housing 70 on the side of the pedestal 3. A gear 71 fixed on the shaft 69 meshes with a gear 72 on one end of a tubular shaft 73 which is journaled in a bearing 74 on the inner wall of the housing 70, and which is connected through a hydraulically operable clutch 75 to a coaxial shaft 76 extending through the pedestal 3 and journaled at opposite ends in bearings 77 and 78.

The clutch 75 may be provided in various forms, and as herein shown comprises an axially floating annular friction disk 79 splined for rotation with the gear 72, and disposed between two friction disks 80 and 81 splined on the shaft 76 within the housing 70. The outer end disk 80 is located in a fixed axial position against the bearing 78, and the other end disk 81 is movable axially to open and close the clutch 75. Suitable compression springs 82 are disposed between and tend to separate the disks 80 and 81 to release the intermediate disk 79. An actuating sleeve 83 is slidable on the shaft 76 and extends through the tubular shaft 73 for abutment at one end with the movable disk 81. The other end of the sleeve 83 is engaged by an annular piston 84 reciprocable on the shaft 76 and within an encircling cylinder 85 fixed thereon. Formed in the shaft 76 is an axial passage 86 opening at one end through radial ports 87 to the closed end of the cylinder 85, and at the other end through radial ports 88 to the interior of a sleeve 89, closely encircling the shaft and rigid with a valve bracket 90, for connection to a source of pressure fluid. The sleeve 89 is formed with an internal annular groove 91 open to a fluid supply line 92 connected to the bracket 90, and adapted for communication with the ports 88. The sleeve 89 and bracket 90 assembly is supported on the shaft 76, and is held against rotation therewith by means of a lug 93 (see Fig. 4) engaging the internal wall structure of the pedestal 3. Two adjusting screws 94 threaded through spaced lugs 95 on the bracket 90 into engagement with opposite sides of a fixed lug 96 serve to locate the bracket axially so as to obtain proper registration of the groove 91 with the ports 88. The supply of pressure fluid to the cylinder 85 will cause the driving disk 79 to be clamped frictionally between the driven disks 80 and 81, thereby completing the drive to the shaft 76.

The shaft 76 (see Figs. 4, 7, and 8) extends through the bearing 77 into a gear box 97 on the outer end of the pedestal 3, and is therein connected through two change gears 98 and 99 to a parallel shaft 100. This shaft is connected through three change gears 101, 102, and 103 to one end of a hob drive shaft 104 which extends longitudinally through the machine bed 1 and is suitably connected to drive the hob spindle 22 in any position of adjustment or feed as more fully disclosed in my aforesaid copending application.

The rotative drive for the work spindle 11 is taken from a shaft 105 on which the intermediate gear 102 is fixed, and which is connected through a differential mechanism 106 to an axially aligned shaft 107. In the form shown, the differential mechanism 106 comprises a cage 108 rotatable about the shafts 105 and 107, and carrying a plurality of annularly arranged pinions 109 and 110. These pinions are in endwise overlapping meshing engagement. Inlet and outlet gears 111 and 112 are fixed respectively on the adjacent ends of the shafts 105 and 107, and mesh respectively with the pinions 109 and 110. Rigid with the cage 108 is a coaxial worm wheel 113 which meshes with a worm 114 on a shaft 115 adapted to be driven in timed relation to the movement of the tool slide 17 as will be more fully described. When the cage 108 is held stationary, the shaft 107 will rotate at the same speed as the shaft 105 to drive the work spindle 11 in predetermined timed relation to the tool spindle 22 regardless of the movement of the tool slide 17. Rotation of the cage 108 will advance or retard the rotation of the work spindle 11 relative to the tool spindle 22 in timed relation to the movement of the tool slide 17.

The outlet shaft 107 of the differential mechanism 106 is connected through a train of speed-change gears 116 to 119 in the gear box 97 to a shaft 120. A bevel gear 121 on the shaft 120 meshes with a bevel gear 122 journaled in the top wall of the pedestal 3 and splined for relative axial movement to a vertical shaft 123 extending upwardly into a spindle drive housing 124 integral with the work slide 7. Fixed on the upper end of the shaft 123 (see Figs. 9 and 10) is an internal gear 125 which meshes with a gear 126 on a worm shaft 127 journaled in a tubular enlargement 128 integral with one side of the housing 124. A worm 129 on the shaft 127 meshes with a worm wheel 130 on the work spindle 11 to complete the spindle drive.

The worm 129 is adjustable relative to the worm wheel 130 to take up backlash. In the present instance, the internal gear 125 is journaled in the lower end of the housing enlargement 128 coaxially with a rotatably adjustable bearing sleeve 131, and the worm shaft 127 is journaled eccentrically in the sleeve for bodily movement toward and from the worm wheel 130 upon rotation of the sleeve to vary the depth of tooth engagement. An adjusting screw 132 is threaded tangentially into the bore of the housing enlargement 128 for engagement with a peripherally facing shoulder 133 formed in one side of the bearing sleeve 131, and is manually adjustable to rotate the sleeve so as to shift the worm 129 through an arcuate path substantially normal to the spindle axis.

The hob feed drive

The hob T is adapted to be fed axially of the work spindle 11 selectively at a rapid rate or a cutting feed rate in either direction by traversing the slide 17 along the ways 18. One of the important features of the present invention is to provide a variable speed mechanism, avoiding the use of change gears and capable of infinite speed adjustment from zero to maximum, for traversing the hob slide 17 in timed relation to the rotation of the spindles 11 and 22. In the present instance, a combination hydraulic and mechanical transmission is employed. The transmission comprises a constant displacement reversible rotary hydraulic motor 134 adapted for connection by a system of hydraulic control circuits with a pump unit 135 as a source of motive fluid. The motor 134 and the pump unit 135 constitute part of a hydraulic feed unit (see Figs. 8 and 11) mounted on the inside of a removable panel 136 in the rear wall of the pedestal 3.

The motor 134 is adapted to be connected to a transmission shaft 137, journaled at opposite ends in a clutch housing 138 on the panel 136, either through a rapid traverse drive or a feed drive. In the present instance, the rapid traverse drive comprises a gear 139 which is connected through an intermediate gear 140 on a shaft 141 to a gear 142 on the motor shaft 143, and which is journaled for rotation on the shaft 137 and adapted to be connected thereto by a rapid traverse one-way friction clutch 144 operable by a clutch yoke 145.

The feed drive is taken from the shaft 141, and comprises a worm 146 thereon meshing with a worm wheel 147 on a transverse shaft 148 in the housing 138. A bevel gear 149 fixed on the shaft 148 meshes with a bevel gear 150 journaled for rotation on the shaft 137 and adapted to be connected thereto by a positive feed clutch 151. The clutch 151 comprises a sleeve 152 splined on the shaft 137 for axial movement by a yoke 153, and having end teeth 154 movable into and out of engagement with complementary teeth 155 on the hub of the gear 150.

The two clutch yokes 145 and 153 are rigidly connected, for joint movement, to an actuating plunger 156 (see Figs. 3 and 4) reciprocable at opposite ends respectively in two hydraulic cylinders 157 and 158 adapted to be alternately supplied with pressure fluid.

The transmission shaft 137 extends from the clutch housing 138 through a worm housing 159 into a lead gear box 160 on the front of the pedestal 3. A worm 161 fixed on the shaft 137 within the housing 159 meshes with a worm wheel 162 on a drive shaft 163 journaled in and extending longitudinally through the bed 1, and having a nut and screw unit drive connection (see Fig. 3) with the hob slide 17 as more fully illustrated in my said copending application.

The transmission shaft 137 is also adapted for connection through lead change gears 164 to 167 in the gear box 160 to the shaft 115 for driving the worm 114 of the differential mechanism 106 so as to advance or retard the rotation of the work spindle 11 in accordance with the feed of the hob slide 17 to compensate for the lead of the teeth when cutting spiral gears.

*Hydraulic system*

Pressure fluid is supplied by the pump unit 135 which is driven by the electric motor 67 from the shaft 69 through gears 168 and 169, and which consists of a variable delivery feed pump 170 and a rapid traverse pump 171 for supplying motive fluid to the hydraulic motor 134, and a gear pump 172 providing an auxiliary source of fluid for actuating the accessory elements of the machine.

The variable delivery feed pump 170 is shown as of the piston and cylinder type having an actuating wobble plate 173 with an adjustable throw, and having an inlet line 174 and a pressure outlet line 175. The outlet line 175 is adapted to be connected through a start and stop valve 176 to a sump or supply tank 177. The wobble plate 173 is operatively mounted against one end of a plunger 178 slidable in a hydraulic cylinder 179, and is axially adjustable to effect a variation in the degree of eccentricity or angularity. An annular end face cam 180 is rotatably adjustable on the cylinder 179, and is adapted for engagement with opposite ends of a diametrical pin 181 extending through the plunger 178 to define the adjustment of the wobble plate 173.

Figure 5:
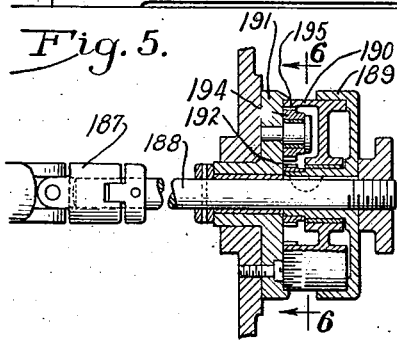
Fig. 5 is a fragmentary detail sectional view of the feed adjustment control taken along line 5—5 of Fig. 1.
Figure 6:
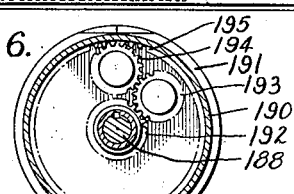
Fig. 6 is a sectional view taken along line 6—6 of Fig. 5.

The cam 180 is manually adjustable to vary the pump displacement for different rates of feed, and to this end is integral with a ring gear 182 meshing with a worm 183 on a shaft 184. This shaft is connected through a universal joint 185 to a shaft 186 in turn connected through a universal joint 187 to a feed control shaft 188 journaled in and extending through the gear box 160 to the front of the machine. A hand knob 189 (see Figs. 4 to 6) is keyed to the shaft 188, and confines a concentric cylindrical graduated dial 190 rotatably against an indicator plate 191 on the front of the case 160. A central gear 192 on the hub of the knob 189 is connected through a train of gears 193 and 194 to an internal gear 195 integral with the dial 190. The gear ratio is such that three revolutions of the knob 189 will effect one revolution of the control dial 190 for the complete range of feed adjustments. To facilitate ease of manual adjustment of the pump 170 during operation, the reaction of the back pressure of the pump on the plunger 178 is partially balanced or offset by directing fluid from the outlet line 175 to the outer end of the cylinder 179.

The rapid traverse pump 171 has an inlet line 196 opening from the sump 177, and discharges to the inlet line 174 of the feed pump 170. The gear pump 172 has an inlet line 197 opening from the sump 177, and an auxiliary pressure discharge line 198.

The start and stop valve 176 (see Figs. 3 and 11ᵇ) comprises a casing 199 formed in one end with a relatively small valve bore 200 and in the other end with a larger valve bore 201. Two pressure control lines 202 and 203 open respectively to opposite ends of the bore 201, and are adapted selectively to be blocked off or connected to exhaust as will be more fully described hereinafter. A centrally apertured stop disk 204 is positioned against the inner end of the bore 201, and constitutes a partition between the two bores 200 and 201. Mounted in fixed position in the center of the bore 201 is a plug 205 having an axial valve passage 206, and defining annular valve seats 207 and 208 at opposite ends. Two valve disks 209 and 210 are slidably disposed in opposite ends of the bore 201 for engagement respectively with the seats 207 and 208. These valve disks have a close sliding fit with the bore 201, and each is formed with a restricted aperture 211. Coil compression springs 212 and 213 disposed in opposite ends of the bore 201 tend to seat the valve disks 209 and 210 with a predetermined spring pressure. Formed in the periphery of the bore 201 are two spaced ports 214 and 215 connected to the pump inlet line 174, and opening about the valve seats 207 and 208 for communication with the passage 206 when the valve disks 209 and 210 are lifted. The passage 206 exhausts through an intermediate port 216 to the sump 177. The bore 200 opens at diametrically opposed points to the pump discharge line 175 and the sump. A valve plunger 217 is reciprocable in the bore 200, and is normally urged by a compression spring 218 against the stop disk 204. The plunger 217 is formed with ports 219 adapted in one position to relieve the pump outlet line 175 to the sump 177.

In operation, when the line 202 is open to exhaust, pressure fluid from the port 214 bleeding through the aperture 211 in the valve disk 209 will be dissipated so that there is no pressure in the inner end of the bore 201. As a result, the plunger 217 will be positioned against the stop disk 204, thereby relieving the pressure line 175 to the sump, and the valve disk 209 will lift to partially relieve the inlet line 174 to the exhaust passage 206. If the control line 202 is blocked, pressure fluid from the port 214 bleeding through the aperture 211 in the disk 209 will build up pressure in the inner end of the bore 201, but the valve disk will remain seated due to differential pressure. The pressure will be transmitted through the apertured stop disk 204 to urge the plunger 217 into position to close the line 175, thereby making pressure fluid available for operation of the machine.

When the control line 203 is open to exhaust and the control line 202 is blocked, pressure fluid from the port 215 bleeding through the aperture 211 in the valve disk 210 into the outer end of the bore 201 will be dissipated. However, the pressure acting on the inner face of the valve disk 210 will tend to lift the disk from the seat 208, thereby discharging part of the delivery of the rapid traverse pump 171 past the seat into the exhaust passage 206, and making available at the feed pump 170 fluid at a predetermined inlet pressure. As a result, pressure fluid will be supplied by the pump 170 to the line 175 at a feeding rate. If both control lines 202 and 203 are blocked, pressure will build up in opposite ends of the bore 201 to maintain both disks 209 and 210 in closed position, thereby causing the full delivery of the rapid traverse pump 171 to pass through the feed pump 170 regardless of the pumping action of the latter. As a result, pressure fluid will be supplied to the line 175 at a rapid traverse rate.

The discharge line 175 of the pump 170 is adapted to be connected through a direction control valve 220 selectively to either of two supply lines 221 and 222 leading respectively to opposite sides of the hydraulic motor 134. The valve comprises a casing 223 having a cylindrical chamber 224 and a spool piston 225 reciprocable therein. In one end position of the piston 225, the pump line 175 is connected to the motor line 221, and the line 222 is connected to an exhaust line 226 leading to a back pressure valve 227 discharging through a line 228 to the sump 177. As a result, the motor 134 will operate in a direction to traverse the tool slide to the left. In the other end position of the piston 225, the motor lines 221 and 222 are connected respectively to the lines 226 and 175 to reverse the operation of the motor 134.

The back pressure valve 227 (see Figs. 3 and 11ᵃ) comprises a casing 229 having a bore 230 one end of which is closed and connected to a branch of the pump line 175 and the other end of which opens past a valve seat 231 to a chamber 232 exhausting to the line 228. A valve piston 233 is slidable in the bore 230, and has a valve member 234 on one end adapted for engagement with the seat 231. Suitable spring means 235 in the chamber 232 acts against the piston 233 in a direction to seat the member 234 against the pressure of the fluid in the closed end of the bore 230. The line 226 from the direction valve 220 opens to an annular groove 236 in the bore 230 adapted for connection to the valve seat 231 when the valve member 234 is in or near closed position. Normally, the valve member 234 tends to block the line 226. If the back pressure exceeds a predetermined amount, it will be reflected in the pump pressure which will lift the valve member 234. Consequently, a substantially constant back pressure will be maintained regardless of variations in cutting resistance.

An annular stop disk 237 is confined by a spring 238 in spaced position for engagement by the piston 233 to limit the maximum normal opening movement of the valve member 234. The piston 233 is formed with an axial bore 239 one end of which opens to the chamber 232, and the other end of which connects with radial passages 240 movable into communication with an annular groove 241 in the valve bore 230, connected to a branch of the pump line 175, when the valve member 234 lifts against the action of the spring 238. If the pump pressure rises substantially above a predetermined desired maximum, the line 175 will be relieved directly through the groove 241, the passages 240 and the bore 239 to the exhaust chamber 232.

Preferably, the pumps 170, 171, and 172 and the valves 176, 220, and 227 are incorporated in a self-contained structure constituting the pump unit 135.

The direction valve 220 is controlled by a pilot valve 242 operable in conjunction with a feed control valve 243, or controlled by a rapid traverse valve 244. These valves form part of a self-contained control unit 245 having a housing 246 mounted on the front of the machine. The housing 246 is closed by upper and lower covers 247 and 248, and is formed with an inner mounting panel 249. A valve block 250 is bolted to the panel 249, and coacts therewith to define various passages and lines of the hydraulic circuits.

The pilot valve 242 (see Figs. 16 and 17) comprises a vertical bore 251 opening through the block 250 and closed at opposite ends by screw plugs 252. Formed in the bore 251 are five annular ports 253, 254, 255, 256, and 257 of which the end ports 253 and 257 are connected to an exhaust line 258 draining to the sump 177. The center port 255 is connected to the auxiliary pressure line 198, and the ports 254 and 256 are connected respectively to two lines 259 and 260 leading to the feed control valve 243. A valve piston 261 of the spool type is slidable in the bore 251, and has an axial stem 262 extending through the lower end plug 252 for selective manual actuation. The end of the stem 262 is connected through parallel links 263 to a crank arm 264 fixed on a rock shaft 265 journaled in and extending through a bearing 266 in the cover 248. A hand lever 267 is fixed on the outer end of the shaft 265, and is adapted to be locked in either of two operative positions by a manually-releasable spring-actuated detent pin 268 normally movable into suitably located recesses 269 in the front of the cover 248. The piston 261 serves in one end position to connect the lines 259 and 260 respectively to the pressure and exhaust lines 198 and 258, and in the other end position to reverse these connections. In each position of adjustment, the pilot valve 242 conditions the system for adjustment of the direction valve 220 upon actuation of the feed control valve 243 to effect feed traverse of the tool slide 17.

The feed control valve 243 (see Figs. 3, 13, 16, and 17) comprises a vertical bore 270 opening through the block 250 and closed by end plates 271 and 272. A plurality of annular ports 273 to 280 are formed in the bore 270 and are controlled by a piston 281 of the spool type having a stem 282 projecting axially through the end plate 271. The ports 273 and 275 are connected to the passages 260 and 259, and the ports 274 and 276 open to two lines 283 and 284 leading respectively to opposite ends of the cylinder bore 224 of the direction valve 220. The ports 280 and 277 are connected respectively to the exhaust line 258 and the line 202 leading to one end of the start and stop valve 176. The two remaining ports 278 and 279 are connected through passages 285 and 286 to the rapid traverse valve 244.

The rapid traverse valve 244 (see Figs. 3, 12, 13, and 17) comprises a vertical bore 287ᵃ opening vertically through the block 250 and closed by end plates 287. Nine annular ports 288 to 296 are formed in the bore 287ᵃ, and are controlled by a valve piston 297 of the spool type having an operating stem 298 extending through the upper end plate 287. Three ports 288, 292, and 296 are connected to the exhaust line 258 and the remaining ports are connected respectively to the pressure line 198, the lines 283 and 284 leading to the direction valve 220, the line 202 leading to one end of the valve 176, and the lines 285 and 286. To provide means for actuating the valve 244, the upper end of the stem 298 is connected by an adjustable link 299 to a crank arm 300 on a rock shaft 301 journaled in the housing 246. The shaft 301 extends through the cover plate 247 and is provided with a hand lever 302. Also fixed on the shaft 301 is a segment or lever 303 having teeth 304 adapted for selective engagement with a yieldable spring-actuated detent pin 305 to locate the valve piston 297 in intermediate neutral position or in either end position. The pin 305 is slidable in a block 306 bolted to the top wall of the housing 246.

The feed control valve 243 is urged downwardly by a compression spring 307 into normal inoperative position, and is adapted to be elevated into operative position as hereinafter described. When the valve 243 is in inoperative position, and the rapid traverse valve 244 is in neutral position, the control line 202 is connected through the ports 277 and 278, the line 285 and the ports 295 and 296 to the exhaust line 258, and all other lines leading to the valves are blocked by the pistons 281 and 297. When the valve 243 is elevated, the lines 259 and 260 are connected respectively to the lines 284 and 283 so as to effect actuation of the direction valve 220 in accordance with the adjustment of the valve 242. and the connection between the lines 202 and 285 is interrupted to condition the pump unit 135 for feed traverse, providing the rapid traverse valve 244 is in neutral position. The line 286 is now connected through the ports 279 and 280 to the exhaust line 258. If the rapid traverse valve 244 should be out of neutral position, the line 286 would be connected to the line 202 through the ports 293 and 294, thereby preventing feed traverse.

Movement of the rapid traverse valve 244 into the upper end position will connect the pilot lines 283 and 284 respectively to the pressure and exhaust lines 198 and 258, and movement into the other end position will reverse these connections. In either operative adjustment, the connection between the lines 258 and 285 is interrupted, and a connection between the lines 202 and 286 is established so that the line 202 will be open to exhaust if the feed control valve 243 is not in inoperative position, thereby preventing rapid traverse. It will therefore be seen that the valves 243 and 244 are interlocked to prevent simultaneous control.

Control by either of the valves 243 and 244 is conditional on position of the work slide 7. The slide 7 is controlled by a starting valve 308 (see Figs. 3, 12, 13, 15, and 17) comprising a vertical bore 309 and a piston 310 of the spool type slidable therein. Formed in the bore 309 are five annular ports, namely, two end ports 311 and 312 connected to the exhaust line 258, a port 313 connected to the pressure line 198, and two ports 314 and 315 connected respectively to lines 316 and 317 leading to opposite ends of the cylinder of the elevating motor 36. A coiled compression spring 318 tends to elevate the piston 310 into position to connect the lines 316 and 317 respectively to the lines 198 and 258 so as to elevate the work slide 7. Upon lowering the piston 310, these connections are reversed to lower the work slide 7.

Interposed in the line 316 is a resistance valve 319 permitting a free flow to the lower end of the motor 36 but restricting the return flow. The purpose of the valve 319 is to hold up the work slide 7 when the pump unit 135 is not in operation. The valve 319 (see Figs. 3 and 13) comprises a bore 320 having an annular port 321 connected to the starting valve 308 and an opening 322 connected to the motor 36. An annular valve seat 323 is fitted in the bore 320 between the port 321 and the opening 322. Slidable in the bore 320 is a longitudinally fluted valve member 324 having an axial valve passage 325 with a ball seat 326 and radial passages 327 open to the port 321. A ball 328 normally engages the seat 326 and prevents a return flow through the passage 325 to the port 321. The valve member 324 is normally urged into engagement with the seat 323 by an adjustable compression spring 329 in the lower end of the bore 320. When the line 316 is connected to exhaust, the fluid in the lower end of the motor 36 can escape through the valve 319 only by moving the valve member 324 from the seat 323 against the pressure of the spring 329. This pressure is sufficient to hold the work slide 7 in elevated position except when the upper end of the motor 36 is connected to pressure.

To permit lowering of the work slide 7 at will, a needle valve 330 is interposed in a by-pass across the lines 258 and 316 between the motor 36 and the resistance valve 319.

The starting valve piston 310 has an actuating stem 331 which projects upwardly from the bore 309, and which is connected by a link 332 to a crank arm 333 on a rock shaft 334 journaled in the housing 246. The shaft 334 extends through the cover 247 and is provided with a hand lever 335. Detent means is provided for holding the piston 310 in lowered position to maintain the work slide 7 in operative position, and this means comprises a spring-actuated pawl 336 pivotal in a lug 337 on the valve block 250, and adapted automatically to engage an annular ratchet groove 338 in the stem 331.

The line 317 to the upper end of the motor 36 has a branch connected through a resistance valve 339 to a line 340 leading to the lower end of the bore 270 of the feed control valve 243. This valve is similar in construction to the valve 319, and will pass fluid to the line 340 when the pressure in the line 317 rises above a predetermined amount, as it will after the work slide 7 has come to rest in operative position. Upon the supply of fluid to the line 317, the valve piston 281 will be elevated hydraulically into operative position. Thereupon, a spring-actuated pawl or latch 341, pivoted in a lug 342 on the end plate 271, will engage in an annular ratchet groove 343 in the stem 282 to hold the valve 243 in operative position. On exhaust, the fluid will pass from the line 340 freely through the valve 339.

The clamps 41 for the work slide 7 are applied simultaneously with actuation of the feed control valve 243, i. e., after the slide has been lowered into operative position. The line 340 to the valve 243 has a branch adapted to be connected by a manual two-way valve 344 to a line 345 connected in common to all the clamp cylinders 62. The valve 344 is operable by a hand lever 346 on the front of the slide 7, and serves in one position to connect the lines 340 and 345 and in the other position to connect the line 345 to the exhaust line 258. Hence the valve 344 affords means for releasing and applying the clamps 41 at will when the slide 7 is held in lowered position.

Mounted on the column 5 for operation by the work slide 7 is a valve 347 controlling the feed clutches 144 and 151, and preventing the hydraulic system from being conditioned for rapid traverse unless the slide is in elevated position. The valve 347 comprises a vertical casing 348 having a bore 349 closed at opposite ends by suitable plates 350 and 351. A plurality of annular ports 352 to 358 are formed in the bore 349, and are controlled by a piston 359 of the spool type having an actuating stem 360 extending through the plate 350. The upper end of the bore 349 and the port 355 are connected to the exhaust line 258, and the port 358 is adapted to be connected to the line 258 by a safety valve 361 when the work and tool spindles 11 and 22 are not in operation. The ports 353, 356 and 357 are connected respectively to the lines 198, 203 and 202. Two lines 362 and 363 open from the closed ends of the clutch cylinders 157 and 158 respectively to the remaining two ports 354 and 352.

A coil compression spring 364 in the lower end of the bore 349 normally holds the piston 359 in elevated position. In this position, the line 203 is blocked to condition the valve 176 for rapid traverse, the lines 362 and 363 are connected respectively to the pressure and exhaust lines 198 and 258, and the line 202 is blocked, subject to connection through the valve 243 or the valve 244 to exhaust. As a result, the feed clutch 151 is open and the rapid traverse clutch 144 is closed; also, the rapid traverse valve 244 is operative.

As the work slide 7 is lowered into operative position, a dog 365 movable therewith engages the upper end of the stem 360 and depresses the valve piston 359. The dog 365 is adjustably mounted on a rod 366 clamped to the slide 7. When the slide 7 reaches operative position, a pawl 367 pivoted on the plate 350 engages releasably in an annular ratchet groove 368 in the stem 360 to hold the piston 359 in lowered position. A dog 369 adjustably mounted on the rod 366 is operable to release the pawl 367 upon elevation of the slide 7 back into inoperative position. In the lowered position of the valve 347, the connections to the lines 362 and 363 are reversed to close the feed clutch 151 and open the rapid traverse clutch 144, and the line 203 is connected to the exhaust line 258 to disable the rapid traverse valve 244. This valve 244 is now available as a manual feed control valve if the automatic cycle is not desired. The line 202 is connected to the port 357 so that the valve 176 will not be conditioned for feed unless the spindles 11 and 22 are rotating.

The safety valve 361 (see Figs. 3 and 7) has a casing 370 mounted on the bracket 90, and formed with ports 371 and 372 connected respectively to the exhaust line 258 and through a line 373 to the port 358 in the valve 347. A piston 374 is slidable in the casing 370, and is connected through a rod 375 and a yoke 376 to a sleeve 377 of a centrifugal governor 378 rotatable with the shaft 76 in the spindle drive. When the shaft 76 is idle, the piston 374 is positioned to connect the ports 371 and 372. Upon rotation of the shaft 76, the piston 374 will move into position to block the port 372.

Operable with the starting valve 308 is a valve 379 for controlling the clutch 75 in the spindle drive. The valve 379 (see Figs. 3, 15, 17 and 18) comprises a vertical bore 380 opening through the block 250 and closed at opposite ends. Opposite ends of the bore 380 are connected to the exhaust line 258. Two ports 381 and 382 are formed in the bore 380, and connected respectively to the pressure line 198 and the line 92 leading to the clutch cylinder 85. A piston 383 is slidable in the bore 380, and has a stem 384 adapted for end engagement by an arm 385 on the shaft 334. A spring 386 tends to elevate the piston 383 so as to connect the line 92 to exhaust. When the piston 383 is depressed, the clutch cylinder 85 is connected to the pressure line 198.

The valve is also manually operable independently of the cycle valve 308, and to this end the stem 384 is formed in one side with a transverse notch 387. An arm 388 fixed on a rock shaft 389 journaled in the cover 247 extends into the notch 387 for engagement with the bottom side thereof. A hand lever 390 is fixed on the outer end of the shaft 389 and carries a spring-actuated detent pin 391 adapted to enter selectively either of two recesses 392 in the cover 247.

The feed control valve 243 and the cycle valve 308 are subjected to automatic control in response to movements of the tool slide 17. The control means comprises a cam block 393 guided by sliding adjustment on the block 306, and adjustably secured, as by a set screw 394, to a rod 395 extending slidably through the housing 246. One end of the rod 395 extends slidably through a lug 396 on the slide 17. Two spaced dogs 397 and 398 are adjustably secured on the rod 395 for engagement by the lug 396 upon movement of the slide 17 respectively into opposite limit positions. A stop collar 399 is slidable on the rod 395 for end engagement with the cam block 393, and is secured to the inner end of a rod 400 extending through the side wall of the housing 246. Lock nuts 401 on the outer end of the rod 400 limit the inward position of the collar 399. Also slidable on the rod 395 and extending slidably through a bearing 402 in the side wall of the housing 246 is an elongated sleeve 403 having inner and outer end flanges 404 and 405. A coiled compression spring 406 encircles the rod 395 and abuts at opposite ends against the collar 399 and the flange 404. The spring 406 tends to urge the collar 399 into its innermost position and the flange 404 against the bearing 402 to locate the cam block 393 in neutral position. A collar 407 fixed on the rod 395 engages the outer flange 405 of the sleeve 403. When the lug 396 engages the dog 398, the cam block 393 is moved to the right out of neutral position and acts against the collar 399 to compress the spring 406. Conversely, when the lug 396 engages the dog 397, the cam block 393 is moved to the left out of neutral position, and the sleeve 403 compresses the spring 406. Thus, in each instance, spring pressure is stored up to return the cam block 393 automatically to neutral position when the lug 396 releases the rod 395.

The cam block 393 is formed to provide selectively either a conventional cycle in which the slide 17 is fed to left and returned rapidly to the right, or a climb cutting cycle in which the feed and rapid traverse movements are reversed. More particularly, the cam block 393 is formed in the bottom along the rear with two cam recesses 408 and 409 and along the front with two cam recesses 410 and 411. The recesses 408 and 410 are adapted for selective engagement with a roller 412 on an arm 413 fixed on a shaft 414 extending slidably and rotatably through the housing 246. Also fixed on the shaft 414 is an arm 415 adapted for engagement with the pawl 341 to release the feed control valve 243. A hand knob 416 on the front end of the shaft 414 affords means for shifting the roller 412 selectively into the path of one or the other of the recesses 408 and 410, spring detent means 417 being provided for holding the shaft yieldably in position of adjustment. Similarly, the recesses 409 and 411 are adapted for engagement with a roller 418 on an arm 419 fixed on a rock shaft 420. This shaft extends slidably through the housing 246 to the front of the cover 247, and is provided with a disengaging lever 421 whereby the roller 418 may be positioned for engagement with one or the other of the recesses 409 and 411, and whereby the shaft may be rocked manually. A second arm 422 on the shaft 420 is adapted for engagement with the pawl 336 to release the starting or cycle valve 308.

When both shafts 414 and 420 are adjusted inwardly, the control is conditioned for an automatic conventional cycle comprising feed to the left, automatic reversal and rapid traverse to the right. In this instance, the cam recess 409 will engage the roller 418 at the end of the feed to trip the cycle valve 308 as a result of which the slide 7 will be elevated to trip the valve 347, thereby blocking the line 203 and closing the clutch 144 for rapid traverse in the reverse direction. At the end of the return, the cam recess 408 will engage the roller 412 to trip the feed control valve 243 and thereby stop the slide 17. If it is desired to stop the slide 17 at the end of the feed, the shaft 414 is pulled out so that the cam recess 410 will engage the roller 412 to release the feed valve 243 before the cam recess 409 engages the roller 418 to trip the valve 308. When both shafts 414 and 420 are pulled out, the cam recess 411 will trip the valve 308 at the end of the feed to the right and the recess 410 will trip the valve 243 at the end of the rapid traverse to the left. In this cycle, adjustment of the shaft 414 inwardly will cause the slide 17 to stop at the end of the feed.

Means is provided for moving the manual rapid traverse valve 244 automatically into neutral position if it is in either end position upon movement of the slide 17 into either limit position. This means comprises two spaced lugs 423 and 424 on the side of the cam block 393, and adapted for engagement respectively with opposite sides of a roller 425 on the arm 303 to center the latter upon movement of the block out of neutral position. The lugs 423 and 424 however are suitably spaced to permit free actuation of the valve 244 at all other times.

Mounted in the housing 246 is a limit switch 426 for a coolant motor (not shown). The switch 426 has an operating shaft 427 with a lever arm 428 carrying a roller 429 on the free end. Slidably and rotatably adjustable in the housing 246 is a rock shaft 430 carrying a wide arm 431 underlying a roller 432 on the arm 333. The arm 431 is shiftable into and out of position over the roller 429. The shaft 430 is provided with a hand knob 433 to facilitate this adjustment, and is held releasably in position of adjustment by a spring detent 434. It will be evident that, when the arm 431 is located between the rollers 429 and 432, actuation of the clutch valve 379 to start the spindles 11 and 22 will result in closing the switch 426 to start the coolant flow. When the spindles are stopped, the coolant supply will stop.

I claim as my invention:

1. A hobbing machine comprising, in combination, a base having a vertical column, a first slide vertically movable on said column either into elevated inoperative position or lowered operative position, a horizontal spindle on said slide, a second slide reciprocable on said base axially of said spindle, a spindle on said second slide, means for rotating said spindles in timed relation, hydraulic means for moving said first slide into operative position, and hydraulic means automatically operable upon movement of said first slide into operative position to move said second slide through a feeding stroke in one direction, said first hydraulic means being automatically operable at the end of said feeding stroke to return said first slide into inoperative position.

2. A hobbing machine comprising, in combination, a base having a vertical column, a first slide vertically movable on said column either into elevated inoperative position or lowered operative position, a horizontal spindle on said slide, a second slide reciprocable on said base axially of said spindle from initial position in a forward direction and then in a reverse direction, a spindle on said second slide, means for rotating said spindles in timed relation, and hydraulic means automatically operable upon the return of said first slide into inoperative position to return said second slide at a rapid traverse rate in said reverse direction into initial position.

3. A hobbing machine comprising, in combination, a base having a vertical column, a first slide vertically movable on said column either into elevated inoperative position or lowered operative position, a horizontal spindle on said slide, a second slide reciprocable on said base axially of said spindle, a spindle on said second slide, means for rotating said spindles in timed relation, manually controllable hydraulic means for traversing said second slide at a rapid traverse rate in either direction when said first slide is in inoperative position, and being inoperable when said first slide is in operative position, and hydraulic means automatically operable upon movement of said first slide into operative position to move said second slide at a feeding rate.

4. A hobbing machine comprising, in combination, a base, a first spindle mounted on said base, a second spindle mounted on said base for translation into and out of operative position relative to said first spindle, and means automatically operable upon movement of said second spindle into operative position to clamp said second spindle in such operative position.

5. A hobbing machine comprising, in combination, a base, a spindle supported on said base, a slide mounted on said base for movement axially of said spindle, a spindle supported on said slide, means for rotating said spindles in timed relation, means for translating said slide, and means for rendering said last mentioned means inoperable unless both spindles are rotating.

6. In a machine tool, in combination, a base having a column with vertical parallel spaced ways, a slide mounted for reciprocation on said ways, adjustable means for limiting the upper and lower end positions of said slide, a hydraulic motor for elevating and lowering said slide, a fluid supply line, an exhaust line, valve means for connecting said lines alternately and reversibly to opposite ends of said motor, a second slide mounted for horizontal reciprocation on said base, a second hydraulic motor for translating said second slide, valve means normally in inoperative position and being movable hydraulically into operative position to control said second motor, a branch line leading from the upper end of said first motor to said valve to supply valve actuating fluid, and a resistance valve interposed in said branch line whereby said valve will be actuated to start said second motor upon movement of said first slide into its lowermost position.

7. In a machine tool comprising, in combination, a base, a column on said base, a first slide reciprocable on said column, a spindle journaled in said slide, a second slide reciprocable on said base axially of said spindle, a spindle journaled in said second slide, means for driving said spindles, a stop abutment on said base, a stop abutment on said column, a vertical stop screw adjustably mounted on said first slide and adapted for engagement selectively with said stop abutments to define respectively an elevated inoperative position and a lowered operative position, means for adjusting said screw axially on said slide, means for locking said screw in position of adjustment, and means for elevating and lowering said first slide.

8. In a machine tool comprising, in combination, a base, a column on said base, a first slide reciprocable on said column, a spindle journaled in said slide, a second slide reciprocable on said base axially of said spindle, a spindle journaled in said second slide, means for driving said spindles, a stop abutment on said base, a stop abutment on said column, a vertical stop mounted on said first slide and adapted for engagement selectively with said stop abutments to define respectively an elevated inoperative position and a lowered operative position relative to said second slide, and means for elevating and lowering said first slide.

9. In a machine tool comprising, in combination, a base, a column on said base, a first slide reciprocable on said column, a spindle journaled in said slide, a second slide reciprocable on said base axially of said spindle, a spindle journaled in said second slide, means for driving said spindles, a stop abutment on said base, a stop adjustably mounted on said first slide and adapted for engagement with said stop abutment to define a lowered position relative to said second slide, and hydraulic means for elevating and lowering said first slide.

10. In a machine tool comprising, in combination, a base, a column on said base, a first slide reciprocable on said column, a spindle journaled in said slide, a second slide reciprocable on said base axially of said spindle, a spindle journaled in said second slide, means for driving said spindles, a stop abutment on said base, a stop adjustably mounted on said first slide and adapted for engagement with said stop abutment to define a lowered position relative to said second slide, a vertical piston and cylinder motor for elevating and lowering said first slide, and hydraulic means for supplying pressure fluid reversibly to opposite ends of said motor and including valve means for hydraulically blocking the lower end of said motor to support said second slide in elevated position upon failure of fluid supply.

11. In a machine tool, in combination, a base having a vertical column, a spindle slide reciprocable on said column, a hydraulic motor for elevating and lowering said slide and having upper and lower fluid supply lines opening to opposite ends, a pressure fluid supply line, an exhaust line, valve means for connecting said supply lines reversibly to said pressure and exhaust lines, a resistance valve interposed in the lower supply line for permitting the passage of fluid freely to the lower end of said motor, a needle valve selectively available to connect the lower end of said motor to said exhaust line, a spindle slide on said base, and means for translating said last mentioned slide, said valve means being adapted to be latched in position to direct pressure fluid to the upper end of said cylinder and to be automatically released for movement into position to direct fluid to the lower end of said cylinder upon movement of said last mentioned slide into a predetermined position.

12. In a machine tool, in combination, a base having a vertical column, a spindle slide reciprocable on said column, a hydraulic motor for elevating and lowering said slide and having upper and lower fluid supply lines opening to opposite ends, a pressure fluid supply line, an exhaust line, valve means for connecting said supply lines reversibly to said pressure and exhaust lines, a spindle slide on said base, and means for translating said last mentioned slide, said valve means being adapted to be latched in position to direct pressure fluid to the upper end of said cylinder and to be automatically released for movement into position to direct fluid to the lower end of said cylinder upon movement of said last mentioned slide into a predetermined position.

13. In a machine tool, in combination, a base having a vertical column, a slide reciprocable on said base, a spindle journaled in said slide, means including a normally open clutch for driving said spindle, a hydraulic motor for closing said clutch, a second slide reciprocable on said base axially of said spindle, a hydraulic transmission for reciprocating said second slide and including a stop valve having a control line adapted upon connection to exhaust to effect adjustment of said valve into stop position, a valve mounted on said column and automatically operable upon movement of said first slide into lowered position to disable said transmission for rapid traverse operation and upon movement of the slide into elevated position to condition said transmission for rapid traverse operation and being operable when said slide is in said lowermost position to connect said control line to exhaust, and a safety valve interposed in said control line and automatically operable independently of said second mentioned valve to close said control line to condition said stop valve for operation upon rotation of said spindle.

14. In a machine tool, comprising, in combination, a base having a vertical column, a first slide reciprocable on said base, a spindle journaled in said slide, a second slide reciprocable on said base axially of said spindle, a spindle journaled in said second slide, means for driving said spindle in positive timed relation including a differential mechanism, hydraulic means for elevating and lowering said first slide selectively into an inoperative position and a lowered operative position, a selective rapid traverse and feed mechanical transmission for translating said second slide and for driving said differential mechanism in timed relation to the movement of said second slide, hydraulic means for operating said mechanical transmission, and valve means for controlling both said hydraulic means, and including valve means operable by said first slide to adjust said mechanical transmission for feed in one direction upon movement of said first slide into operative position and for rapid traverse in a reverse direction upon movement of said first slide into inoperative position.

15. A hobbing machine comprising, in combination, a support, a first slide movable on said support either into inoperative position or operative position, a spindle on said slide, a second slide reciprocable on said support axially of said spindle, a spindle on said second slide, means for rotating said spindles in timed relation, hydraulic means for moving said first slide into operative position, and hydraulic means automatically operable upon movement of said first slide into operative position to move said second slide through a feeding stroke in one direction, said first hydraulic means being automatically operable at the end of said feeding stroke to return said first slide into inoperative position.

16. A hobbing machine comprising, in combination, a support, a first slide movable on said support either into inoperative position or operative position, a spindle on said slide, a second slide reciprocable on said support axially of said spindle, a spindle on said second slide, means for rotating said spindles in timed relation, manually controllable hydraulic means for traversing said second slide at a rapid traverse rate in either direction when said first slide is in inoperative position, and being inoperable when said first slide is in operative position, and hydraulic means automatically operable upon movement of said first slide into operative position to move said second slide at a feeding rate.

17. In a machine tool comprising, in combination, a support, a first slide reciprocable on said support, a spindle journaled in said slide, a second slide reciprocable on said support axially of said spindle, a spindle journaled in said second slide, means for driving said spindles, a stop abutment on said support, a second stop abutment on said support, a stop screw adjustably mounted on said first slide and adapted for engagement selectively with said stop abutments to define respectively an inoperative position and an operative position, means for adjusting said screw axially on said slide, means for locking said screw in position of adjustment, and means for reciprocating said first slide.

18. In a machine tool, comprising, in combination, a support, a first slide reciprocable on said support, a spindle journaled in said slide, a second slide reciprocable on said support axially of said spindle, a spindle journaled in said second slide, means for driving said spindles, a stop abutment on said support, a stop adjustably mounted on said first slide and adapted for engagement with said stop abutment to define an operative position relative to said second slide, and hydraulic means for reciprocating said first slide.

19. A hobbing machine comprising, in combination, a first spindle and a support therefor, a second spindle reciprocable axially of said first spindle, and a combination mechanical and hydraulic transmission for translating said second spindle, said transmission including cycle control means selectively adjustable to obtain either an automatic cycle comprising a feeding movement in one direction, an automatic reversal at the end of said feeding movement, an automatic rapid traverse return movement in the other direction, and an automatic stop at the end of said return movement, or a reverse automatic cycle comprising a feeding movement in said other direction, an automatic stop at the end of said last mentioned feeding movement, an automatic rapid traverse return movement in said one direction, and an automatic stop at the end of said last mentioned return movement.

20. A hobbing machine comprising, in combination, a base, a first spindle mounted on said base, a second spindle mounted on said base for translation into and out of operative position relative to said first spindle, means automatically operable upon movement of said second spindle into operative position to clamp said second spindle in position of adjustment, and means automatically operable upon movement of said second spindle into operative position to translate said first spindle relative to said second spindle.

21. A hobbing machine comprising, in combination, a support, a first slide movable on said support either into inoperative position or operative position, a spindle on said slide, a second slide reciprocable on said support axially of said spindle, a spindle on said second slide, means for rotating said spindles in timed relation, drive means for moving said first slide into operative position, and drive means automatically operable upon movement of said first slide into operative position to move said second slide through a feeding stroke in one direction, said first drive means being automatically operable at the end of said feeding stroke to return said first slide into inoperative position.

22. A hobbing machine comprising, in combination, a support, a first slide movable on said support either into inoperative position or operative position, a spindle on said slide, a second slide reciprocable on said support axially of said spindle, a spindle on said second slide, means for rotating said spindles in timed relation, manually controllable means for traversing said second slide at a rapid traverse rate in either direction when said first slide is in inoperative position, and being inoperable when said first slide is in operative position, and drive means automatically operable upon movement of said first slide into operative position to move said second slide at a feeding rate.

BENJAMIN R. PURVIN.